Sept. 20, 1932.  J. P. BELL  1,877,792
FENDER LAMP FOR AUTOMOBILES, ETC
Filed Dec. 17, 1931
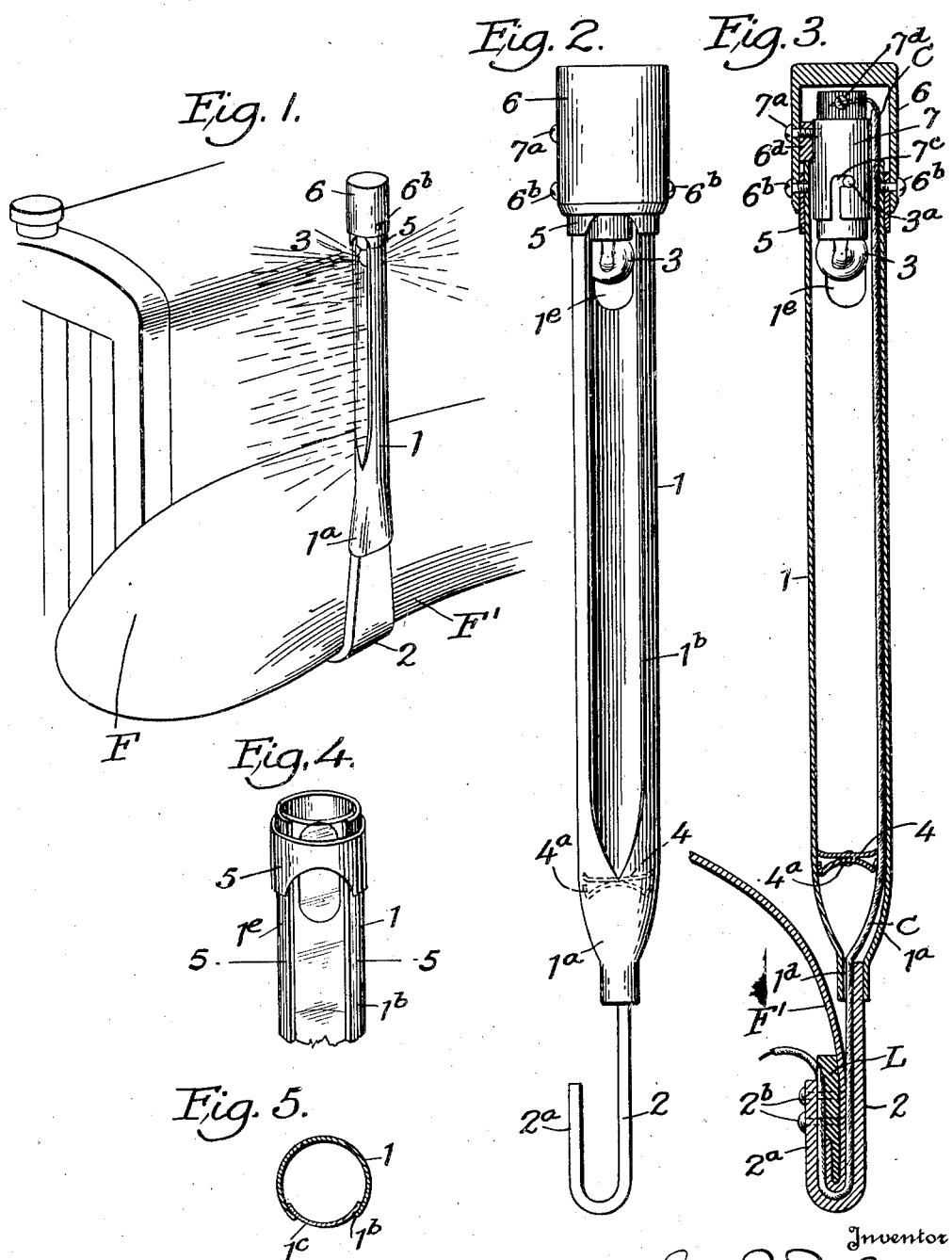

Patented Sept. 20, 1932

1,877,792

UNITED STATES PATENT OFFICE

JOHN P. BELL, OF BALTIMORE, MARYLAND

FENDER LAMP FOR AUTOMOBILES, ETC.

Application filed December 17, 1931. Serial No. 581,750.

This invention is a novel improvement in fender lamps and the principal object of the invention is to provide a simple, novel and efficient lamp adapted to be mounted on the edge of the front left fender of an automobile, the lamp consisting of a vertically disposed tubular reflector carrying at its upper end an electric light bulb mounted so as to direct its rays downwardly into the tube, the tube being split at its front so as to present a vertical column of light defining to the driver of approaching vehicles the extreme side limit of the automobile, and thus prevent or materially reduce the number of head-on and side-swiping collisions between automobiles when attempting to pass in opposite directions at night; the tube also having an aperture in is rear portion directly behind the bulb so as to be visible from the rear of the lamp and to throw a beam of light rearwardly to serve in place of the well-known parking light which is ordinarily mounted on the rear left fender of the automobile.

A further object of the invention is to provide novel means for connecting the lamp to the fender.

Other minor objects of the invention will be hereinafter set forth.

I will explain the invention with reference to the accompanying drawing which illustrates one practical embodiment thereof to enable others to adopt and use the same; and will summarize in the claims the novel features of construction, and novel combinations of parts, for which protection is desired.

In said drawing:

Fig. 1 is a perspective view illustrating a portion of the front left fender of an automobile showing my novel fender lamp mounted thereon.

Fig. 2 is a front elevation of the lamp detached.

Fig. 3 is a vertical section through the casing.

Fig. 4 is a perspective view of the upper portion of the casing with the cap removed.

Fig. 5 is a section on the line 5—5, Fig. 4.

As shown in the drawing my novel fender lamp preferably comprises a combined reflector and casing 1 consisting of a length of tubing, preferably brass or the like, which may be nickel plated or otherwise finished. The lower end of the tubing is contracted as at 1a, and is fixedly secured by brazing or welding to a U-shaped clip 2, also of brass or other non-rustable material, the leg to which the tube 1 is attached being preferably longer than the other leg 2a. The U-shaped clip 2 is adapted to fit under and around the usual vertical flange F' at the outer edge of the fender F of the automobile, and the shorter leg of the clip may be securely riveted, bolted or screwed as at 2b to the flange F', whereby the casing 1 will be vertically disposed at the extreme side limit of the fender F of the automobile. Preferably a rubber lining L is provided between the legs of the clip 2 and the fender flange F' to prevent rattling or chattering of the parts.

The front portion of the tube 1 is preferably cut away as at 1b for most of its length to form a narrow slit through which the column of light from the bulb 3 is visible from the front of the automobile, and the interior of the tube is preferably highly polished or mirrored in any desired manner to form a reflector for the light bulb. The opening or slit 1b in the front of the tube may be closed by a transparent sheet 1c (Fig. 5) of cellophane, glass, or the like to keep the reflecting surfaces of the tube clean, and protect the bulb 3. Within the tube 1 adjacent the base of the slit 1a is a disk 4 securely mounted by means of legs 4a in the casing, said disk 4 being also polished and serving as a bottom reflector for the light bulb, and also as a means for closing the lower end of the opening 1b in the tube.

Around the upper end of the tube is a band 5, securely brazed or welded to the tube, to prevent spreading of the upper portion of the split tube 1, and to provide a sufficient thickness of material for the reception of the cap retaining screws 6b hereinafter described.

The upper end of the tube is covered by means of a tubular cap 6 closed at its upper end, said cap making a sliding fit over the ring 5, and being secured in place on the tube 1 by means of the screws 6b passing through the cap into the band 5. Within the cap is a split metallic ring 6a preferably of brass or other conducting material adapted to slidably receive the metallic socket member 7 for the electric light bulb 3, which socket member 7 is retained in the split ring 6a by means of a screw 7a passing through the cap 6 through the split ring 6a and engaging a depression in the side of the metallic socket 7, whereby the socket will be securely held in place in the cap. The mouth of the socket is directed downwardly and is provided with the usual bayonet slots 7c for receiving the bayonet projections 3a on the electric light bulb.

The electric light bulb 3 is visible below the band 5 of the casing when the parts are assembled as shown. The electrical conductor C for the bulb 3 may consist of a single wire connected through a suitable switch (not shown) to the battery (not shown) of the automobile, said wire C passing through the rubber lining L around and under the fender flange F' and upwardly through a bore 1d in the lower end of the tube 1, past the disk 4, and through the tube 1 and up through the cap 6 to terminal 7d on the socket member 7. The metal of the lamp structure and the automobile chassis forms the return circuit from the bulb 3 in the usual manner.

In the upper end of the tube 1 behind the bulb 3 and disposed opposite the slit 1b is an opening 1e through which the bulb 3 throws a rearwardly directed beam of light which may be used as a parking light when the vehicle is parked, thereby dispensing with the usual parking light which is ordinarily mounted on the rear left fender of the automobile.

By the above construction a novel fender lamp is provided which will present a vertical column of light at the front of the vehicle to denote to the drivers of oncoming vehicles the extreme side limit of the vehicle, the lamp being mounted on the edge of the left front fender as in Fig. 1. My lamps will prevent or materially reduce the number of "head-on" collisions and those due to sideswiping of machines moving in opposite directions on the road, as my lamp will enable the driver of the approaching vehicle to know at a glance without having to guess the side limit of the vehicle.

I claim:

1. In combination with an automobile having side fenders, a fender lamp comprising a tubular casing vertically mounted on the left front fender at the outer edge thereof; said casing having an elongated vertical split in its front portion; a cap closing the upper end of the casing; and an electric light bulb mounted in the underside of and carried by the cap, whereby a vertical column of light is visible through the split from the front end of the automobile defining the extreme side limit of the automobile.

2. In a lamp as set forth in claim 1, said cap making a sliding fit over the upper end of the casing; a split ring secured within the cap; a socket retained in the split ring and carrying the bulb; and a conductor extending through the casing and into the cap and connected with one terminal of the socket.

3. In a lamp as set forth in claim 1, the interior of the casing forming a reflector, and a reflecting disk in the tube at the lower end of the split and facing the bulb.

4. In combination with an automobile having side fenders, a fender lamp comprising a metallic tubular casing; the lower end of the tube being contracted; a U-shaped clip secured to the contracted end of the casing and adapted to engage the flange at the outer edge of the fender, whereby the lamp is vertically mounted on the fender; said casing having an elongated split in its front portion; a cap closing the upper end of the casing; and an electric light socket and bulb mounted in the underside of the cap whereby a vertical column of light is visible through the split from the front end of the automobile defining the extreme side limit of the automobile.

JOHN P. BELL.